(12) United States Patent
Wilson et al.

(10) Patent No.: US 10,948,662 B2
(45) Date of Patent: *Mar. 16, 2021

(54) INTEGRATED PIN AND SOCKET FIBER OPTIC CLEANER TIP

(71) Applicant: FiberQA, LLC, Old Lyme, CT (US)

(72) Inventors: Douglas H. Wilson, Mystic, CT (US); Michael Bogue, Amston, CT (US); Robert Brucato, Cheshire, CT (US)

(73) Assignee: FiberQA, LLC, Old Lyme, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,259

(22) Filed: Sep. 5, 2019

(65) Prior Publication Data
US 2019/0391342 A1 Dec. 26, 2019

Related U.S. Application Data

(63) Continuation of application No. 15/924,419, filed on Mar. 19, 2018, now Pat. No. 10,502,906.

(Continued)

(51) Int. Cl.
*G02B 6/38* (2006.01)
*B08B 1/00* (2006.01)

(52) U.S. Cl.
CPC .............. *G02B 6/3866* (2013.01); *B08B 1/00* (2013.01); *B08B 2240/02* (2013.01)

(58) Field of Classification Search
CPC ......... G02B 6/3866; B08B 1/00; B08B 1/001; B08B 1/003; B08B 1/008; B08B 2240/02

(Continued)

(56) References Cited

U.S. PATENT DOCUMENTS

| 5,179,419 A | 1/1993 | Palmquist et al. |
| 5,657,131 A | 8/1997 | Csipkes et al. |

(Continued)

FOREIGN PATENT DOCUMENTS

| EP | 1681588 A2 | 7/2006 |
| EP | 2116880 A1 | 11/2009 |

(Continued)

OTHER PUBLICATIONS

PCT/US18/23059, "International Application Serial No. PCT/US18/23059, International Preliminary Report on Patentability dated Oct. 3, 2019", Fiberqa, LLC, 5 pages.

(Continued)

*Primary Examiner* — Mark Spisich
(74) *Attorney, Agent, or Firm* — GTC Law Group PC & Affiliates

(57) ABSTRACT

A cleaning module adapted to clean a socket style ferrule or a pin style ferrule of a connector includes a tip assembly extending from a housing comprising a tip adapted to receive a cleaning media. A retractable alignment sleeve sized to surround the pin style ferrule has a larger outer diameter than an inner diameter of a socket opening and moves along the tip assembly when the first end presses against a surface of the connector. A sleeve spring engages with a portion of the tip assembly and a first end of the retractable alignment sleeve. The tip assembly includes a block movably secured within a portion of the housing. A main spring may be engaged with the housing and engaged with an end portion of the block, wherein the sleeve spring has both a spring constant and total compressive force that are lower than that of the main spring.

9 Claims, 4 Drawing Sheets

Related U.S. Application Data

(60) Provisional application No. 62/473,455, filed on Mar. 19, 2017.

(58) Field of Classification Search
USPC .................. 15/97.1, 210.1; 385/134, 147
See application file for complete search history.

(56) References Cited

U.S. PATENT DOCUMENTS

| | | |
|---|---|---|
| 6,178,285 B1 | 1/2001 | Csipkes et al. |
| 6,449,795 B1 | 9/2002 | Sato |
| 6,466,366 B1 | 10/2002 | Dominique |
| 6,705,767 B1 | 3/2004 | Dean et al. |
| 6,758,605 B1 | 7/2004 | Villemaire et al. |
| 7,042,562 B2 | 5/2006 | Kiani et al. |
| 7,113,273 B2 | 9/2006 | Pahk et al. |
| 7,221,805 B1 | 5/2007 | Bachelder |
| 7,356,236 B1 | 4/2008 | Huang et al. |
| 7,808,624 B2 | 10/2010 | Wells |
| 7,837,801 B2 | 11/2010 | Christopher et al. |
| 8,699,012 B2 | 4/2014 | Duis et al. |
| 8,988,670 B2 | 3/2015 | Zhou et al. |
| 9,151,694 B2 | 10/2015 | Wilson et al. |
| 9,528,908 B2 | 12/2016 | Wilson et al. |
| 2002/0131748 A1 | 9/2002 | Sato |
| 2003/0098045 A1 | 5/2003 | Loder et al. |
| 2004/0125366 A1 | 7/2004 | Kiani et al. |
| 2004/0165181 A1 | 8/2004 | Kume et al. |
| 2007/0023067 A1 | 2/2007 | Kida et al. |
| 2008/0304051 A1 | 12/2008 | Wells |
| 2009/0219434 A1 | 9/2009 | Kauhanen |
| 2011/0085158 A1 | 4/2011 | Motter et al. |
| 2011/0085159 A1 | 4/2011 | Levin et al. |
| 2011/0150395 A1 | 6/2011 | Steinblatt et al. |
| 2011/0303241 A1 | 12/2011 | Tourigny |
| 2013/0194566 A1 | 8/2013 | Schell et al. |
| 2013/0229650 A1 | 9/2013 | Wilson et al. |
| 2014/0211200 A1 | 7/2014 | Kim |
| 2014/0268114 A1 | 9/2014 | Zhou et al. |
| 2015/0029495 A1 | 1/2015 | Megason et al. |
| 2015/0362680 A1 | 12/2015 | Nakane |
| 2015/0367386 A1 | 12/2015 | Wilson et al. |
| 2017/0059788 A1 | 3/2017 | Nakane |
| 2018/0267253 A1 | 9/2018 | Wilson et al. |

FOREIGN PATENT DOCUMENTS

| | | |
|---|---|---|
| JP | 2012048037 A | 3/2012 |
| JP | 2014206733 A | 10/2014 |
| TW | 201843466 | 12/2018 |
| WO | 2012114494 A1 | 8/2012 |
| WO | 2013134278 A1 | 9/2013 |
| WO | 2018175278 A1 | 9/2018 |

OTHER PUBLICATIONS

PCT/US18/23059, "International Application Serial No. PCT/US18/23059, International Search and Written Opinion dated Jun. 18, 2018.", FIBERQA, LLC, 6 pages.

PCT/US2013/029144, "International Application Serial No. PCT/US2013/029144, International Preliminary Report on Patentability With Written Opinion dated Sep. 18, 2014", FIBERQA, LLC, 6 Pages.

PCT/US2013/029144, "International Application Serial No. PCT/US2013/029144, International Search Report and Written Opinion dated Jun. 21, 2013", FIBERQA, LLC, 10 pages.

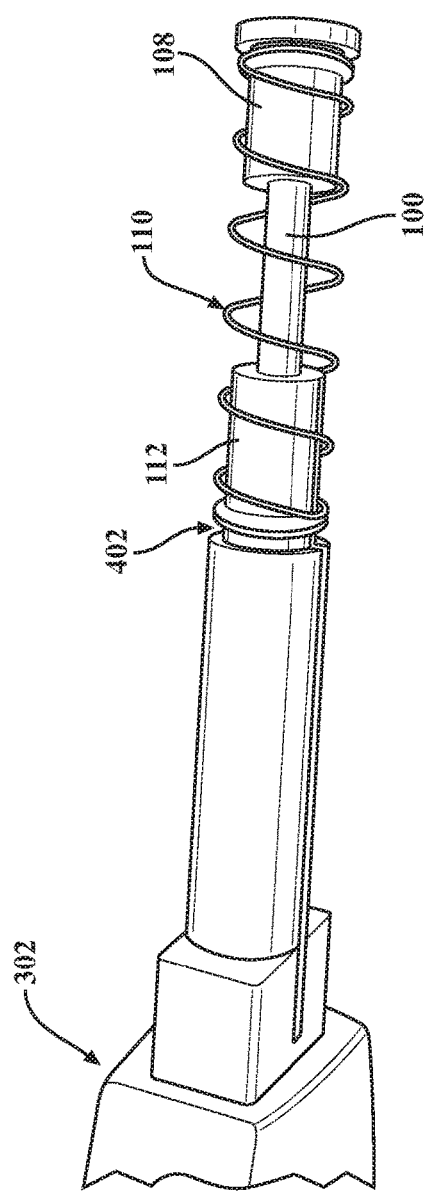
FIG. 4A
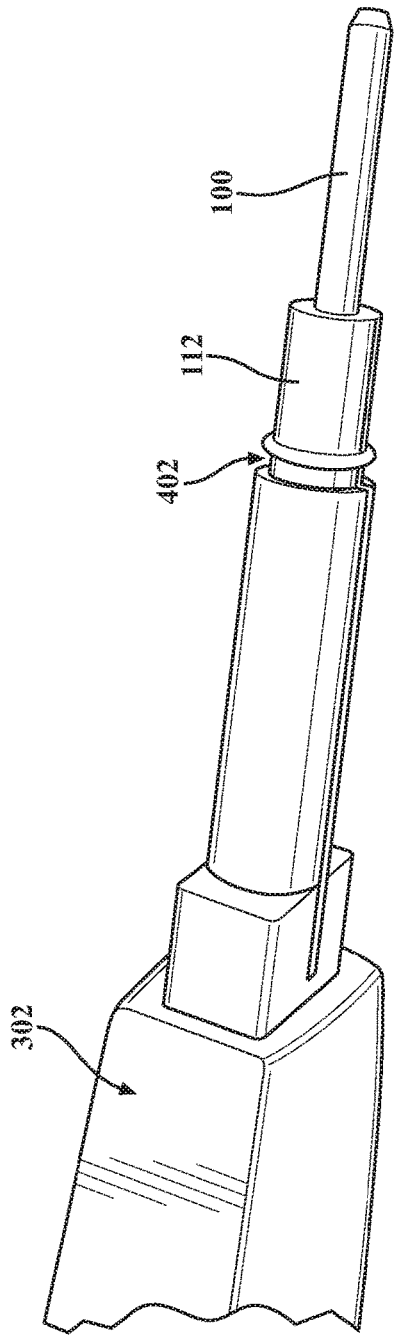
FIG. 4C
FIG. 4B

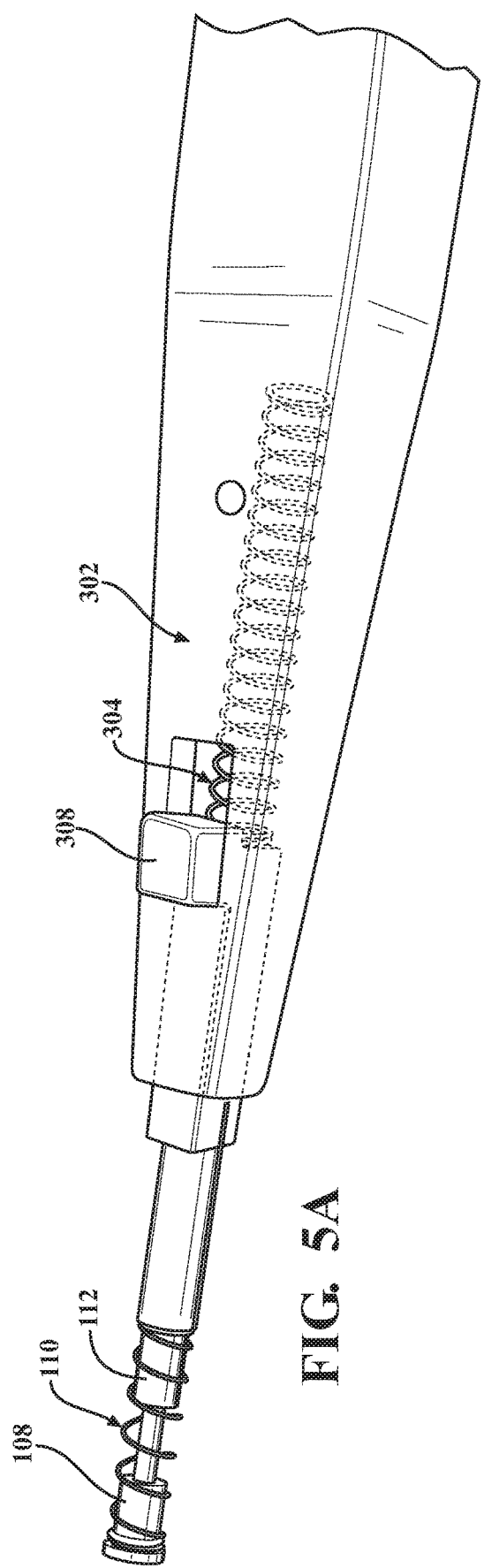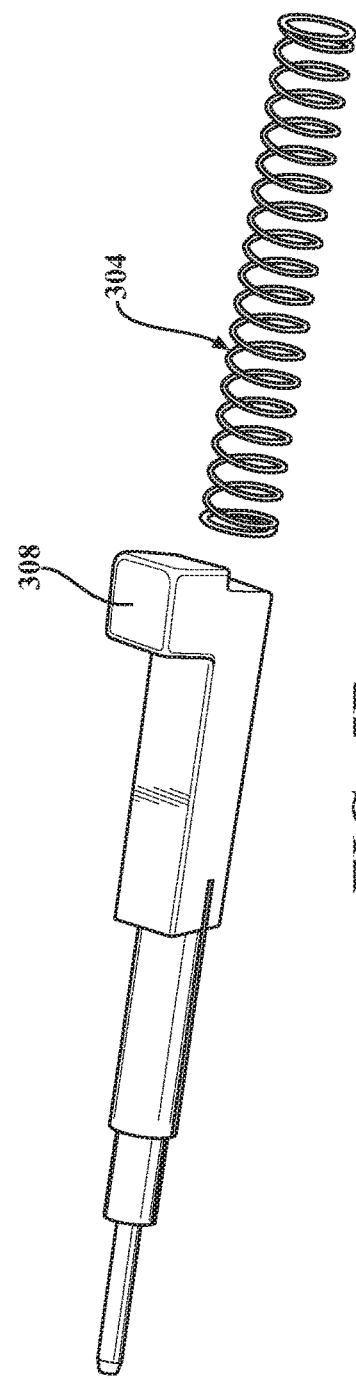
FIG. 5A
FIG. 5B

US 10,948,662 B2

INTEGRATED PIN AND SOCKET FIBER OPTIC CLEANER TIP

CLAIM TO PRIORITY

This application is a continuation of the following U.S. patent application, which is incorporated by reference in its entirety: U.S. Ser. No. 15/924,419, filed Mar. 19, 2018, now U.S. Pat. No. 10,502,906.

U.S. Ser. No. 15/924,419 claims the benefit of the following provisional application, which is hereby incorporated by reference in its entirety: U.S. Ser. No. 62/473,455, filed Mar. 19, 2017.

BACKGROUND

Field

The methods and systems described herein generally relate to enhanced fiber optic cleaning methods and systems.

Description of the Related Art

Single fiber ferrules are found in connectors as both pins (exposed) and sockets (recessed). The performance of the fiber optic connection requires stringent cleanliness of the end faces. A variety of cleaning methods have been widely in use, such as automated cleaning for both single fiber and MT ferrules, which have multiple fibers, using a dry, contact cleaning technique. In certain cleaning devices and techniques, a separate cleaning cartridge, or alternatively a separate adapter, is required to clean ferrules configured as sockets versus pins.

In integrated inspection and cleaning systems, to make the integrated cleaning easy to use, certain systems avoid the use of adapters or external tips. Furthermore, it is highly desirable not to have to change cartridges to handle sockets and pins, especially in the case where both types may co-exist in the same product.

Therefore, there remains a need for an improved method for cleaning of both pins and sockets with a single device.

SUMMARY

In an aspect, a cleaning module adapted to clean a ferrule socket or pin may include a tip assembly comprising a tip, the tip adapted to receive a cleaning media, wherein the tip is moved to make contact with an end face of the ferrule and is further moved relative to the ferrule to clean the ferrule, a retractable alignment sleeve spring-mounted on a retractable alignment sleeve spring, wherein the sleeve retracts upon the tip's insertion into the ferrule socket, and wherein the sleeve is sized to surround the pin, and a main spring that extends the tip assembly, wherein the retractable alignment sleeve spring has both a spring constant and total compressive force that are lower than the main spring. The cleaning module may include a circulation facility for circulating the cleaning media within a housing of the cleaning module and on the tip to expose an unused portion of cleaning media that contacts the ferrule, wherein new unused cleaning media is continually provided while used cleaning media is continually carried away. The tip may be a rectangular tip adapted for cleaning optical fiber end faces of MT connectors. The cleaning media may be selected from one or more materials, such as polyester, nylon, a polyester fabric, a nylon fabric, or combinations thereof or other materials with mechanical properties chosen for the specific cleaning requirements.

The cleaning module may include a force controller that controls a force pushing the cleaning tip against the ferrule. The cleaning module may include a mechanism for sensing the position of the cleaning tip relative to the module.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The invention and the following detailed description of certain embodiments thereof may be understood by reference to the following figures:

FIGS. 4A and 4B illustrate an annular bump to retain the end of a spring.

FIG. 4C illustrates an annular bump to retain the end of a spring.

FIG. 5A illustrates a top down view of the cleaning assembly.

FIG. 5B illustrates the block and main spring of the cleaning assembly.

DETAILED DESCRIPTION

This disclosure provides methods and systems related to enhanced fiber optic end face cleaning. To obtain high levels of transmission in fiber optic systems such as are found in communication systems and various types of fiber optic sensors, it is important that the ends of the fiber optic connections be clean and defect free when installed. Consequently, it is important to be able to clean the ends of fiber optic components including the optical fibers.

The disclosure herein concerns a novel, non-obvious cleaning tip design for a cleaner cartridge or cleaner assembly 302 that includes a feature that enables cleaning of both sockets and pins of a connector using a single integrated device. Both sockets and pins may be mounted in inserts or other features of a parent connector. Sockets are ferrules that may be mounted recessed into an alignment sleeve in the connector's insert or housing. The pins may be mounted with the ferrule proud of the insert or connector housing.

Figure 1:
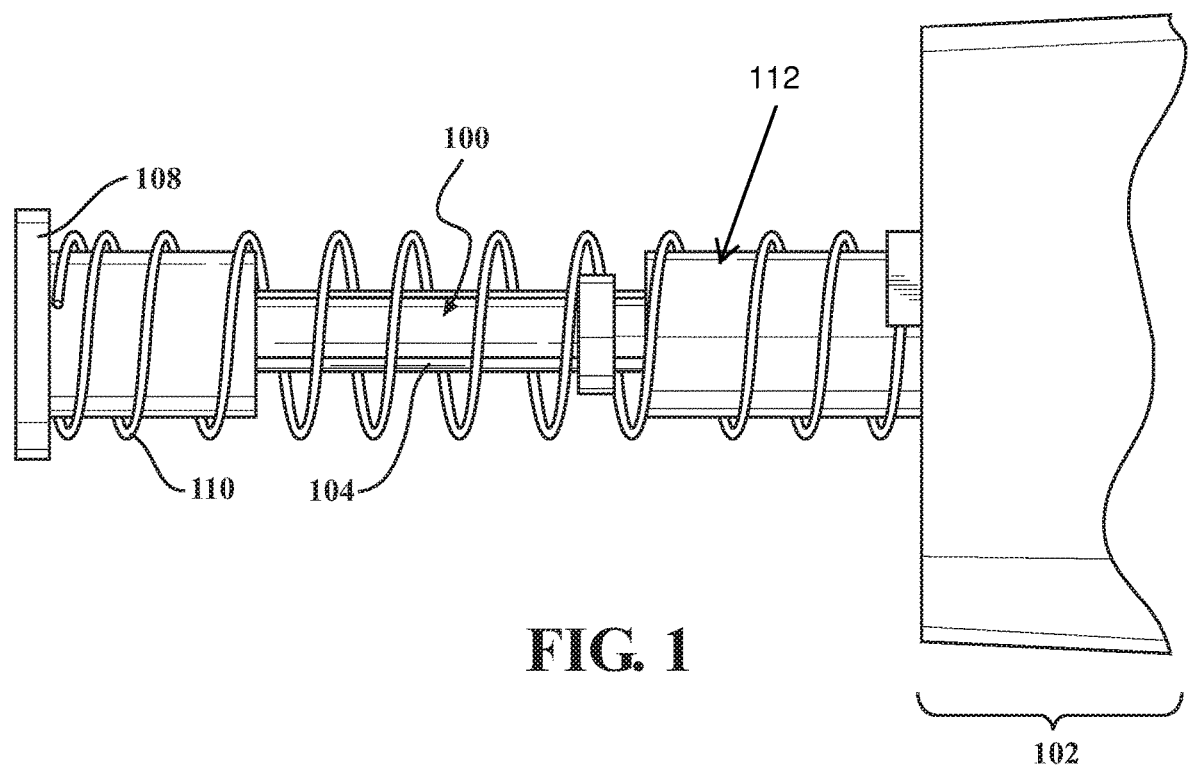
FIG. 1 is an illustration of a cleaning tip with the retractable alignment sleeve extended.
Figure 2:
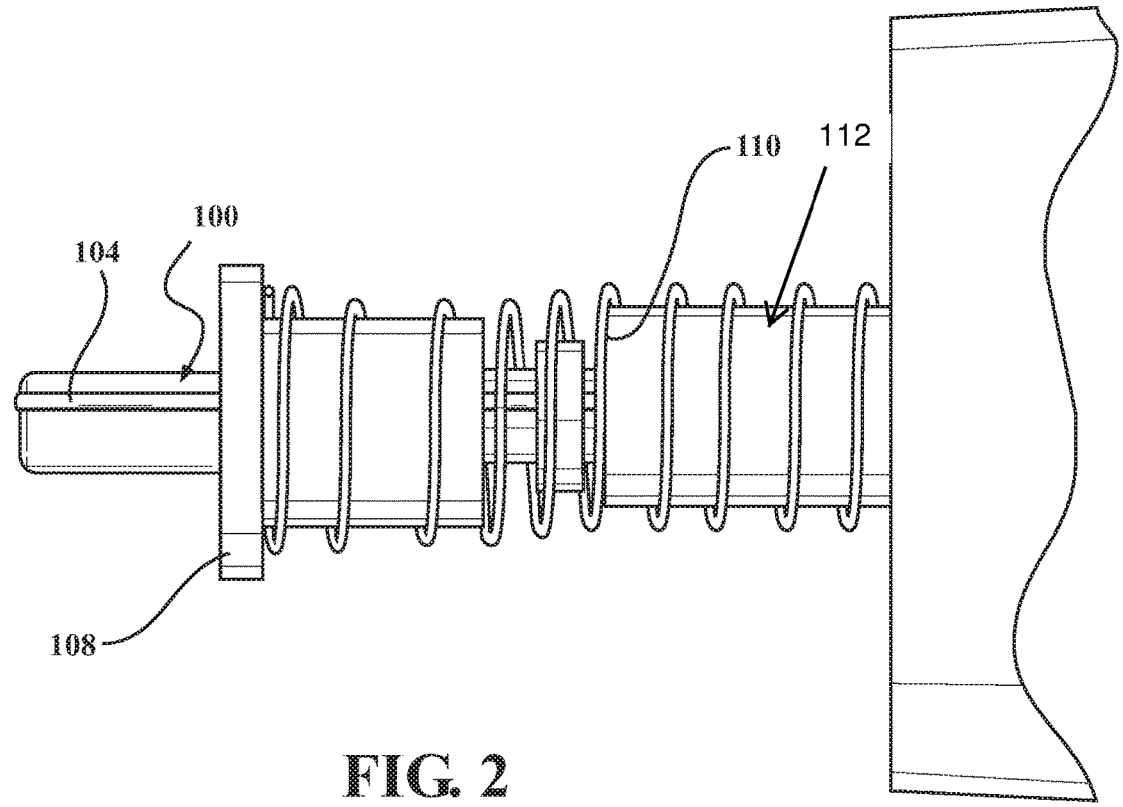
FIG. 2 is an illustration a cleaning tip with the retractable alignment sleeve retracted.
Figure 3:
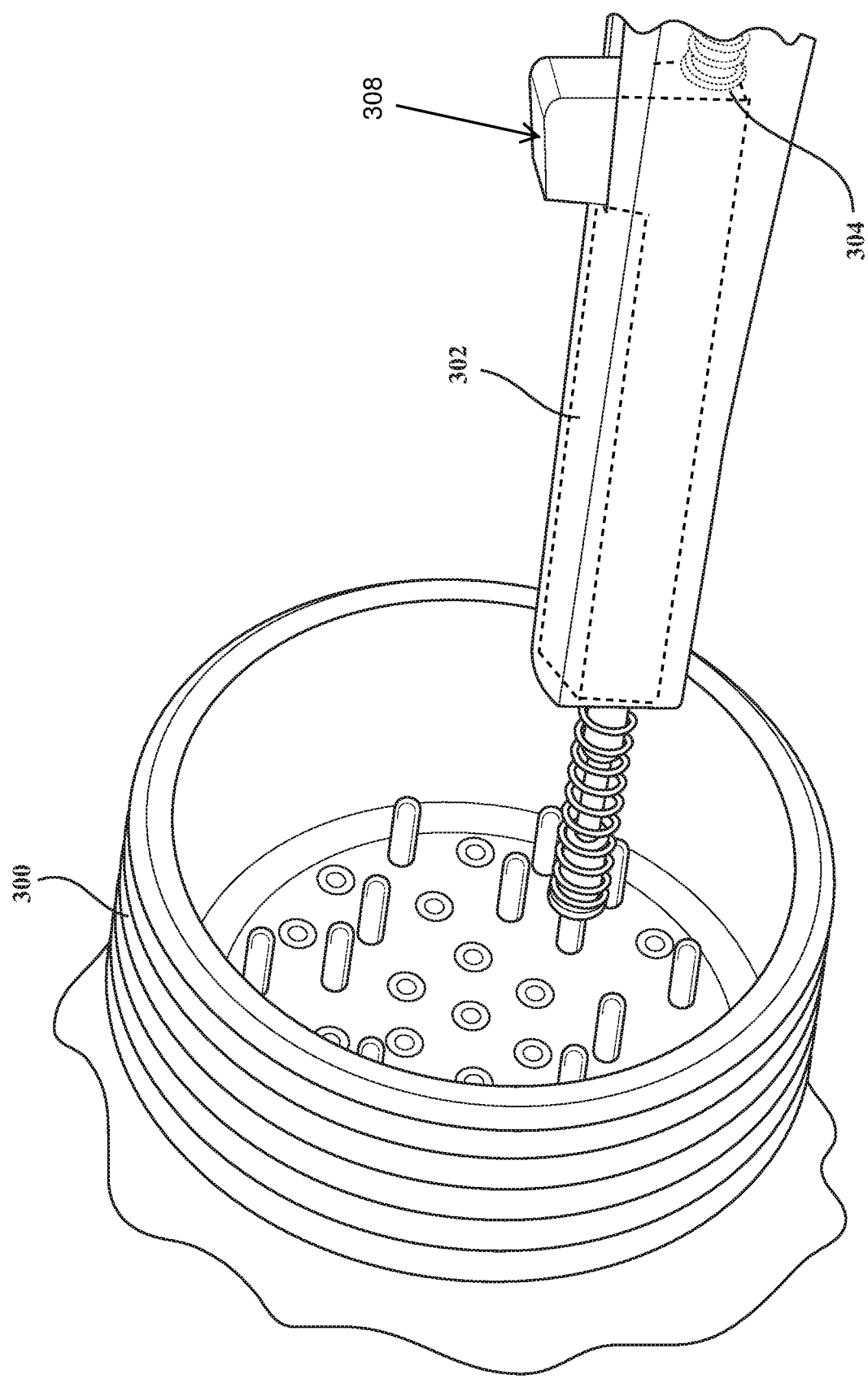
FIG. 3 is an illustration of a cleaning tip with the retractable alignment sleeve extended engaged with a pin.

Referring to FIG. 1, the tip 100 of the cleaning assembly 302, housed in the cleaner body 102 (which is only partially shown in FIG. 1), delivers the cleaning media 104 to the part being cleaned. In the case of sockets, this tip 100 must fit inside the alignment sleeve of the connector's insert or housing. This means that the tip 100 must be smaller in diameter than the ferrule, which range in size from less than 1 mm to up to 2.5 mm or more, depending on the ferrule or connector mod el. The same tip 100 would ordinarily not be able to clean a pin-style ferrule, as the tip 100 would not be held in place on the exposed end of the ferrule. This disclosure addresses this deficiency by adding a retractable alignment sleeve 108. The retractable alignment sleeve 108 is spring-mounted on a spring 110 so that it remains extended to surround or otherwise envelop a pin, but is automatically pushed out of the way when the retractable alignment sleeve 108 presses against the surface of the connector insert and retracts upon the tip's 100 insertion into a socket. In FIG. 1, the retractable alignment sleeve 108 is extended, such as for use with pins. In FIG. 2, the retractable alignment sleeve 108 is retracted to expose the tip 100 and cleaning media 104, such as for use with sockets, where the tip 100 inserts into the socket. An example of engagement with a pin inside a circular connector 300 (e.g. a MIL-38999 circular connector) is shown in FIG. 3, where the retractable alignment sleeve 108 is extended and the tip assembly 302 is being pushed forward by a main spring 304. While FIGS. 1-3 depict the cleaning tip 100 and retractable alignment sleeve 108 as being round, other shapes such as square, rectangular, oval, triangular, or any shape that best fits the ferrule type being cleaned are possible.

The spring 110 that extends the retractable alignment sleeve 108 has both a spring constant and total compressive force that may be lower than the main spring 304 for the overall cleaning tip. In embodiments, this configuration prevents the alignment sleeve spring 110 from working against the main spring 304, retracting the entire tip mechanism. The alignment sleeve's outer diameter is larger than the inner diameter of the insert opening, either continuously or by having a flanged end. In use on an insert-style ferrule, the retractable alignment sleeve 108 will stop against the outside of the insert's opening, since the flange is larger in diameter than the opening of the connector insert. The cleaning tip 100 will continue to move forward, since the main spring 304 is much stronger than the retractable alignment sleeve spring 110. When the alignment sleeve 108 presses against the surface of the connector insert, it is constrained by that surface. The spring 304, which presses against the end of the block 308, or in a bore (not shown) on block 308, compresses as the cleaner continues to move toward the connector. The cleaning tip 100 is free to continue to move along with the rest of the cleaning cartridge. FIG. 5a shows a top down view of the cleaning assembly 302 and the placement of the spring 304 against the block. In FIG. 5b, the block 308 has been removed from the assembly 302 to show how the spring 304 rests in a bore on the block 308.

Once the inner tip 100 makes contact with the ferrule, the entire tip assembly 302 retracts until the cleaner body 102 stops moving forward. In embodiments, the cleaner may include a mechanism for sensing the position of the cleaning tip 100 relative to the cleaner body 102. Any number of position sensors could be used, such as mechanical devices coupled to a potentiometer, measuring the applied spring force, a magnet sensor, an optical non-contact sensor, and the like. This position information may be used to control the total applied force during the tip engagement with the ferrule end face, such as with a force controller. The force pushing the cleaning tip 100 against the fiber optic may be controlled by a force controller.

FIG. 4A illustrates an annular bump 402 of the retaining member 112 that serves to retain spring 110 on the tip. FIG. 4B also shows the annular bump 402, with the spring 110 and alignment sleeve 108 removed for better visibility. FIG. 4C shows an annular bump 408 on the alignment sleeve 108 which also serves to retain the spring 110. In some embodiments, retaining member 112 may be a portion of or continuous with block 308, while in other embodiments, retaining member 112 and block 308 are separate items.

The cleaning media 104 may be a thread-based cleaning media however, other cleaning media are possible such as fabrics, yarns or felts. The cleaning media 104 may include various lint-free materials including for example, polyester, nylon, or any other suitable material. The cleaning media 104 may be guided through the cleaning tip 100 so that when the cleaning tip 100 is pushed forward to contact the part to be cleaned, the cleaning media 104 is pulled across it which results in a cleaning. The tension and speed of movement of the cleaning media 104 may be controlled by a cleaning media controller.

In some embodiments, during the cleaning process, the cleaning media 104 may be moved by a cleaning media controller from a supply spool through a media guide slot of the tip 100 to a take-up spool, where the supply spool and the take-up spool may be located inside the cleaning media controller or may be external to it. The cleaning media 104 may be supplied on the supply spool and the take-up spool as a cartridge (not shown) that is inserted into or located adjacent to the cleaning media controller. A media guide slot (not shown) may guide the cleaning media 104 down the length of the cleaning tip 100 such that the cleaning media 104 is at least partially exposed at the cleaning tip 100 during the cleaning process and contact is achieved with the fiber optic with the force provided by the spring 304 and/or force controller. In embodiments, it is the dragging of the cleaning media 104 across the end of the fiber optic and the cleaning properties of the cleaning media 104, such as the abrasiveness relative to contaminations, that determine the effectiveness of the cleaning process. By dragging the cleaning media 104 through the cleaning tip 100, new unused cleaning media 104 is continually provided while used cleaning media 104 along with particles and materials that have been removed from the end of the fiber optic from the cleaning process are continually carried away.

The cleaning tip 100 may be used to clean a variety of fiber optics, ferrules and fiber optic connectors, including connectors with single fiber or multi-terminal fibers. Exemplary types include cylindrical ferrules with single fibers, such as FC, SC, ST, LC, MU, SMA, and ferrules with multiple fibers such as MT, MPO, and PRIZM. In addition, multiple ferrules, also called termini, may be housed in various styles of round or rectangular connectors, such as MIL-38999 circular connectors, and array connectors.

The cleaning tip 100 of this disclosure can be integrated with other systems, such as ferrule cameras, integrated fiber optic inspection and cleaning systems, and the like. The cleaning tip 100 may form a modular component of the integrated fiber optic inspection and cleaning system, for example.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A cleaning module adapted to clean a socket style ferrule or a pin style ferrule of a connector, comprising:
   a housing;
   a tip assembly extending from the housing, the tip assembly comprising a tip, the tip adapted to receive a cleaning media;
   a retractable alignment sleeve with a first end thereof having a larger outer diameter than an inner diameter of a socket opening, the retractable alignment sleeve adapted to move along the tip assembly during use between a first position adjacent the tip and a second position displaced from the tip in a direction toward the housing, wherein the retractable alignment sleeve retracts when the first end presses against a surface of the connector, and further wherein the retractable alignment sleeve is sized to surround the pin style ferrule;

a sleeve spring having a first end portion engaged with a portion of the tip assembly and a second end portion engaged with the first end of the retractable alignment sleeve, the tip assembly comprising a block movably secured within a portion of the housing; and a main spring engaged within the housing and engaged with an end portion of the block that allows the tip assembly to move relative to the housing during use, and further wherein the sleeve spring has both a spring constant and total compressive force that are lower than that of the main spring.

2. The cleaning module of claim 1, wherein the cleaning module comprises a guide slot to continually provide an unused portion of cleaning media to the tip that contacts the socket style ferrule or the pin style ferrule, and wherein the cleaning media is continually carried away after use.

3. The cleaning module of claim 1, wherein the tip is a rectangular tip adapted for cleaning optical fiber end faces of MT connectors.

4. The cleaning module of claim 1, wherein the cleaning media is selected from one or more of a fabric, a thread, and a yarn.

5. The cleaning module of claim 4, wherein the fabric is a polyester or nylon fabric.

6. The cleaning module of claim 4, wherein the fabric is a felt material.

7. The cleaning module of claim 1, wherein the tip assembly is mounted to the block.

8. The cleaning module of claim 1, wherein the tip assembly is integral with the block.

9. The cleaning module of claim 1, wherein the cleaning media is formed of a lint-free material.

* * * * *

UNITED STATES PATENT AND TRADEMARK OFFICE
CERTIFICATE OF CORRECTION

| | |
|---|---|
| PATENT NO. | : 10,948,662 B2 |
| APPLICATION NO. | : 16/561259 |
| DATED | : March 16, 2021 |
| INVENTOR(S) | : Douglas H. Wilson et al. |

It is certified that error appears in the above-identified patent and that said Letters Patent is hereby corrected as shown below:

In the Specification

In Column 2, Line 61, delete "mod el." and insert -- model. --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*